United States Patent [19]
Disch

[11] Patent Number: 6,137,378
[45] Date of Patent: *Oct. 24, 2000

[54] ELECTRICAL SIGNAL PHASE COMPENSATOR HAVING THREE PARALLEL CONDUCTORS OF DIFFERING LENGTHS

[76] Inventor: Michael R. Disch, 8301A Lapham St., West Allis, Wis. 53214

[ * ] Notice: This patent issued on a continued prosecution application filed under 37 CFR 1.53(d), and is subject to the twenty year patent term provisions of 35 U.S.C. 154(a)(2).

[21] Appl. No.: 08/910,955

[22] Filed: Aug. 8, 1997

[51] Int. Cl.[7] .................................. H01P 1/18; H03H 7/18
[52] U.S. Cl. ............................. 333/156; 333/161; 381/97
[58] Field of Search .................................... 333/156, 161, 333/162; 381/97

[56] References Cited

U.S. PATENT DOCUMENTS

| | | | |
|---|---|---|---|
| 4,538,023 | 8/1985 | Brisson | 174/115 |
| 4,945,189 | 7/1990 | Palmer | 174/32 |
| 5,123,052 | 6/1992 | Brisson | 381/77 |
| 5,142,252 | 8/1992 | Brisson | 333/4 |
| 5,230,022 | 7/1993 | Sakata | 381/98 |
| 5,576,671 | 11/1996 | Agar, Jr. et al. | 333/161 X |
| 5,801,601 | 9/1998 | Gayle | 333/161 X |

*Primary Examiner*—Robert Pascal
*Assistant Examiner*—Justin P. Bettendorf
*Attorney, Agent, or Firm*—Andrus, Sceales, Starke & Sawall, LLP

[57] ABSTRACT

An electrical signal phase compensator includes at least two conductors and a ground wire. In a two conductor system, the length of the first conductor is substantially longer than the second conductor. The first conductor and the second conductor are connected in parallel. In a three conductor system, the length of the second conductor is substantially longer than the third conductor. The first conductor is substantially longer than the second conductor. The first conductor, the second conductor, and the third conductor are connected in parallel. In a second preferred embodiment, the electrical signal phase compensator includes a neutral line which is disposed adjacent to the corresponding signal line. Each respective neutral line is connected in parallel. Each end of the plurality of neutral lines is terminated with a potentiometer. Each potentiometer is connected to ground. The electrical signal phase compensator may also be implemented on a circuit board with traces of different lengths.

14 Claims, 6 Drawing Sheets

ELECTRICAL SIGNAL PHASE COMPENSATOR HAVING THREE PARALLEL CONDUCTORS OF DIFFERING LENGTHS

BACKGROUND OF THE INVENTION

1. Field of the Invention

The present invention relates generally to electrical phase compensators and more specifically to an electrical signal phase compensator that is less complicated and more effective than that of the prior art.

2. Discussion of the Prior Art

A problem with the transmission of electrical signals is the medium through which they are transmitted. A higher frequency signal will travel faster down a conductor than a lower frequency signal. For example, this phenomenon reduces the quality of audio signals by inducing a phase difference between the high and low frequency signals as they travel on the conductor. This problem can be helped by having a conductor which has varying diameters of wire. The higher frequencies flow down the smaller wires and the lower frequencies flow down the larger diameter wires, due to skin effect.

There have been at least three attempts in the prior art to correct the phase difference between high and low frequencies in a transmission medium. The first is Brisson, U.S. Pat. No. 4,538,023; an audio cable comprises an inner conductor and an outer conductor which consists of numerous wires which are twisted around the inner conductor to compensate for the phase difference between high and low frequencies. The second is Brisson, U.S. Pat. No. 5,123,052; a discrete capacitor is used in conjunction with a transmission line to compensate for the phase difference between high and low frequencies. The third is Sakata, U.S. Pat. No. 5,230,022. An active circuit is used to compensate for the phase difference between high and low frequencies.

None of the above prior art patents disclose an electrical signal phase compensator which overcompensates or anticipates the delays of high and midrange frequencies which will occur when the signal passes through subsequent electrical circuits.

Accordingly, there is a clearly felt need in the art for an electrical signal phase compensator which does not use an active circuit, a capacitor, or an inductor to correct phase differences between high and low frequencies. There is also a further need for an electrical signal phase compensator which overcompensates or anticipates the delays of high and midrange frequencies which have been encountered and also for those which will be encountered in subsequent circuitry. The high and midrange frequencies are overcompensated such that all frequencies are in-phase at the output of the subsequent circuitry.

SUMMARY OF THE INVENTION

The primary objective of the present invention is to provide an electrical signal phase compensator which does not use an active circuit, a capacitor, or an inductor to correct phase differences between high and low frequencies. There is also a further need for an electrical signal phase compensator which overcompensates or anticipates for delays of high and midrange frequency signals which have been encountered and also for those which will be encountered in subsequent circuitry.

According to the present invention, an electrical signal phase compensator includes at least two conductors and a ground wire. In a two conductor system, the length of the first conductor is substantially longer than the second conductor. The length of the ground wire is not important. The first conductor and the second conductor are connected in parallel. Each conductor and ground wire is insulated.

In a three conductor system, the length of the second conductor is substantially longer than the third conductor. The first conductor is substantially longer than the second conductor. The length of the ground wire is not important. The first conductor, the second conductor, and the third conductor are connected in parallel. It is also possible for the electrical signal phase compensator to have four or more wires. Each diameter of wire is chosen to accommodate a particular frequency range. Each conductor and ground wire is insulated.

In a second preferred embodiment, the electrical signal phase compensator includes a neutral line which is disposed adjacent to the corresponding signal line. Each respective neutral line is connected in parallel. Each end of the plurality of neutral lines is terminated in various ways with potentiometers or resistors. Each potentiometer or resistor is connected to ground. Adjustment of the potentiometer with an audio signal will cause a shift of the amplitude of the audio signal to be increased or decreased.

The electrical signal phase compensator can be implemented by using wire that is wrapped around a spool or printed as traces on a circuit board. The conductors may also be wrapped around each other. The different conductors may be wrapped on a spool in a radial fashion or adjacent to each other. The different conductors may be replicated on a circuit board by nesting different length traces within each other or using multiple layers. The conductors are wrapped in such a way that no inductance is generated in the conductor.

One advantage of the electrical signal phase compensator is synchronization of electromagnetic fields which result from the propagation of signals down a conductor. The higher frequency signals will travel down the smaller diameter conductor because it provides a decreased impedance path. The higher frequency signals will also arrive at the end of their conductor faster than a lower frequency signal. The increased conductor lengths for higher frequency signals compensate for the faster propagation speed of the higher frequency signals; thus facilitating the synchronization of the electromagnetic fields and preventing any deleterious effect that occurs from electromagnetic fields which are not synchronized. Conductor lengths and diameters are optimized according to the frequencies, currents, and effects desired. The electrical signal phase compensator will work with the same size wires, but performance will be decreased.

The electrical signal phase compensator will work for all frequencies, currents, and voltages. Currents from low frequency DC pluses for controlling motors to higher frequencies for video applications and microprocessors will benefit from this invention. The electrical signal phase compensator will work anywhere the design of electromagnetic properties are critical to the operation, such as microprocessors, disk drives, or tape devices. Microprocessors with limited real estate, will benefit from improved signal flow. Hard disk drive and tape devices have shown improvement in performance utilizing the present invention.

Accordingly, it is an object of the present invention to provide an electrical signal phase compensator which improves the the sonic qualities of audio signals by eliminating the phase differences between different frequencies.

It is a further object of the present invention to provide an electrical signal phase compensator which improves the clarity of phone conversations by eliminating the phase differences between different frequencies.

It is yet a further object of the present invention to provide an electrical signal phase compensator which allows the transmission of higher speed modem communications.

It is yet a further object of the present invention to provide an electrical signal phase compensator which improves the performance of motor controllers.

It is yet a further object of the present invention to provide an electrical signal phase compensator which overcompensates high and midrange frequencies such that all frequencies will be in-phase at the output of the subsequent circuitry.

Finally it is another object of the present invention to provide an electrical signal phase compensator which improves the sharpness of a video display.

These and additional objects, advantages, features and benefits of the present invention will become apparent from the following specification.

DETAILED DESCRIPTION OF THE PREFERRED EMBODIMENTS

Figure 1:
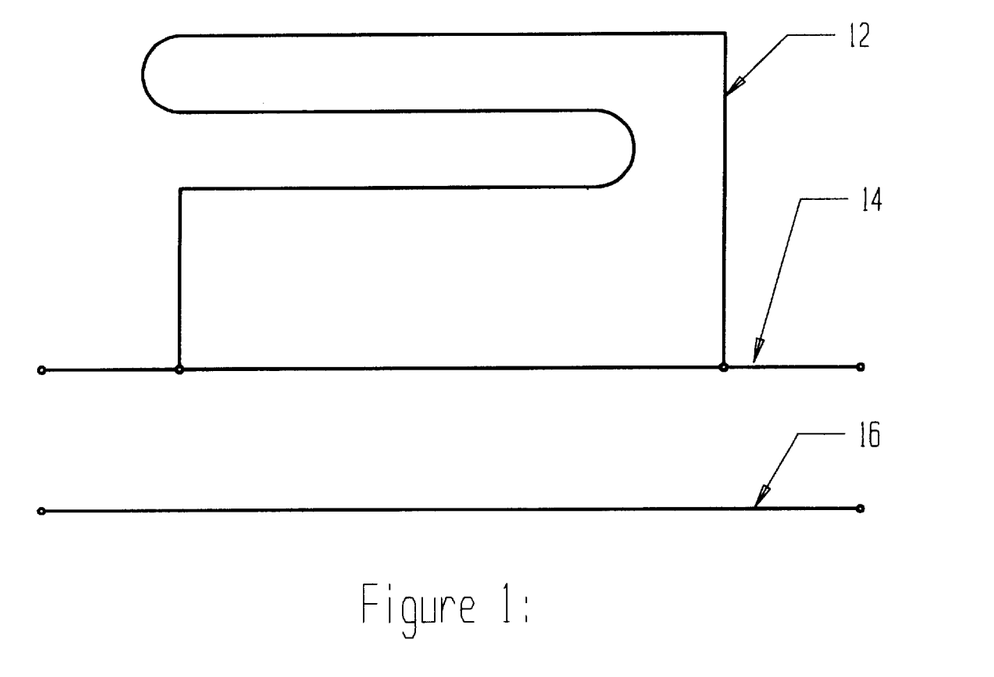
FIG. 1 is a schematic diagram of a two conductor electrical signal phase compensator in accordance with the present invention.

With reference now to the drawings, and particularly to FIG. 1, there is shown a two conductor electrical signal phase compensator 1. The two conductor electrical signal phase compensator 1 includes a first conductor 12, a second conductor 14, and a ground wire 16. It is preferable to decrease the diameter of conductors for higher frequencies to further improve signal quality and optimize skin effect.

Preferred values are given as an example, and not by way of limitation. It has been found that satisfactory performance is achieved for audio signals when the first conductor 12 has a gauge of between 24–30, and the second conductor 14 has a gauge of between 14–20. The length of the second conductor 14 is at least two feet. The first conductor 12 is at least ten feet The ground wire 16 may be any length that is convenient relative to the length of the second conductor 14. The gauge of the ground wire 16 should be equal to the gauge of the largest gauge conductor. The first conductor 12 and the second conductor 14 are connected in parallel. Each conductor and ground wire is insulated.

Figure 2:
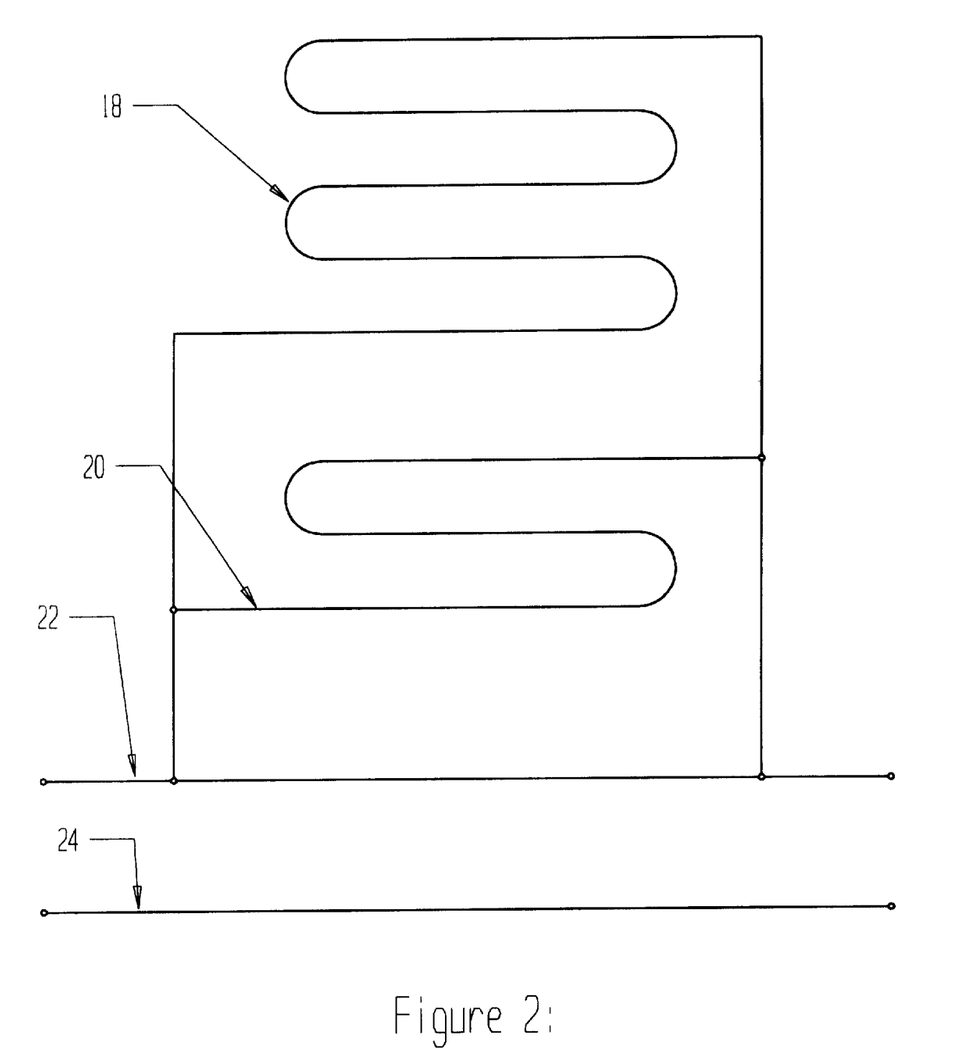
FIG. 2 is a schematic diagram of a three conductor electrical signal phase compensator in accordance with the present invention.

FIG. 2 shows a three conductor electrical signal phase compensator 2. The three conductor electrical signal phase compensator 2 includes a first conductor 18, a second conductor 20, a third conductor 22, and a ground wire 24. It is preferable to decrease the diameter of conductors for higher frequencies to further improve signal quality and optimize skin effect. Preferred values are given as an example, and not by way of limitation. It has been found that satisfactory performance is achieved for audio signals when the first conductor 18 has a gauge of between 24–30, the second conductor 20 has a gauge of between 18–22, and the third conductor 22 has a gauge of between 14–20. The length of the third conductor 22 is at least two feet. The second conductor 20 is at least ten feet. The first conductor 18 is at least twenty feet. The ground wire 24 may be any length that is convenient relative to the length of the third conductor 22. The gauge of the ground wire 24 should be equal to the gauge of the largest gauge conductor. The first conductor 18, the second conductor 20, and the third conductor 22 are connected in parallel. In audio electronics, the low frequencies will travel on the third conductor 22, the midrange frequencies will travel on the second conductor 20, and the high frequencies will travel on the first conductor 18. Each conductor and ground wire is insulated.

The preferred lengths of the conductors in both the two and three wire configurations are chosen to provide a slight overcompensation to the high and midrange frequencies. The low frequencies will arrive at the end of the three conductor signal phase compensator 2 faster than the midrange frequencies. The midrange frequencies will arrive at the end of the three conductor electrical signal phase compensator 2 faster than the higher frequencies. This choice of phase overcompensation or speeding up of the high and midrange frequencies will compensate for phase delay which will occur when the midrange and higher frequencies go through subsequent circuitry. The length of the conductors in the electrical signal phase compensator can also be designed to make all frequencies arrive at the same time.

Figure 3:
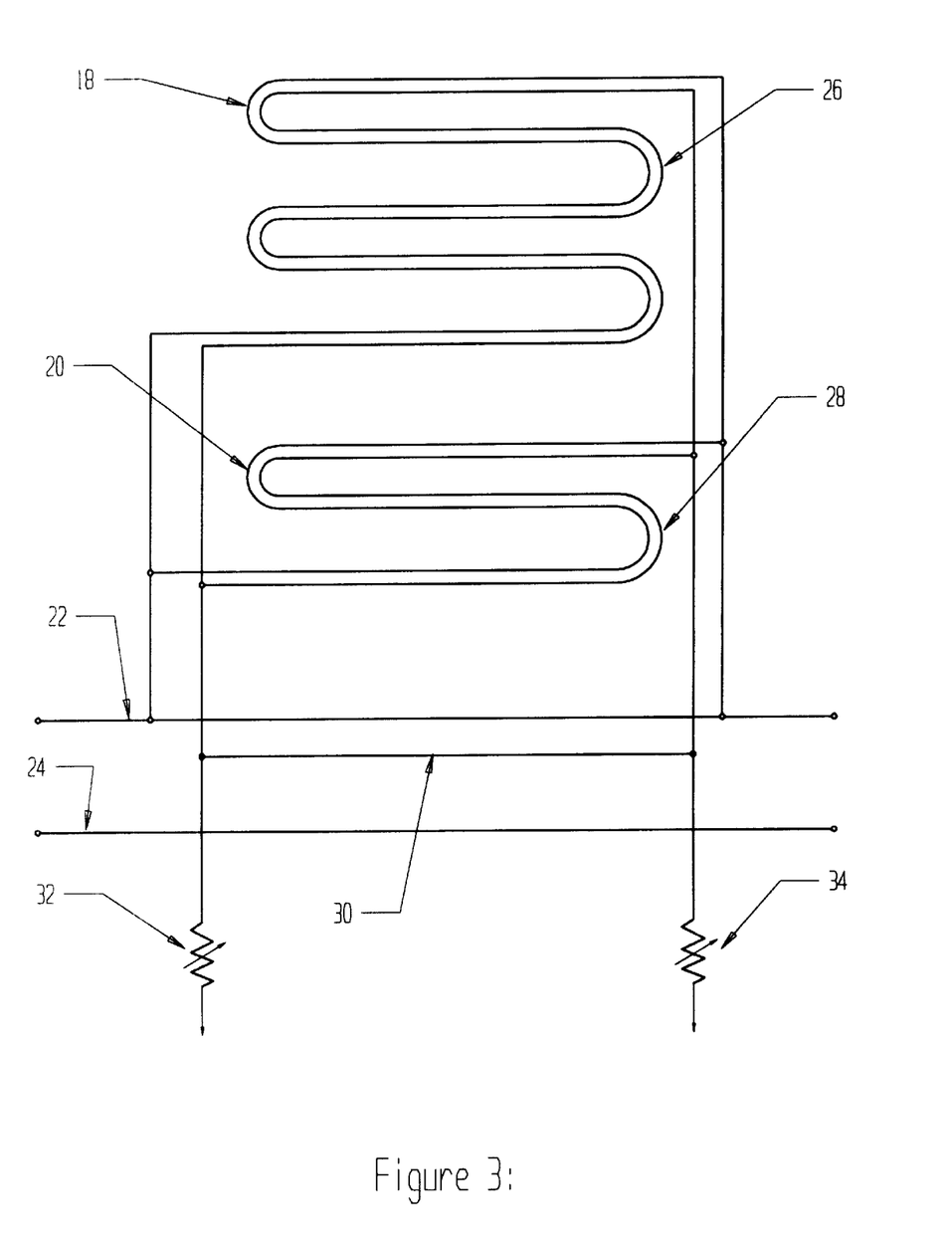
FIG. 3 is a schematic diagram of an electrical signal phase compensator with a neutral wire for each conductor in accordance with the present invention.

FIG. 3 is a schematic diagram of an electrical signal phase compensator 3 with a neutral wire for each conductor. The electrical signal phase compensator 3 includes a first conductor 18, a second conductor 20, a third conductor 22, a first neutral wire 26, a second neutral wire 28, a third neutral wire 30, and a ground wire 24. The first neutral wire 26 is disposed adjacent to the first conductor 18; the second neutral wire 28 is disposed adjacent to the second conductor 20; and the third neutral wire 30 is disposed adjacent to the third conductor 22.

The first neutral wire 26, second neutral wire 28, and the third neutral wire 30 may be connected in parallel. One end of the plurality of neutral wires is terminated with a first potentiometer 32 and the other end is terminated with a second potentiometer 34. The first potentiometer 32 and the second potentiometer 34 are connected to ground. Adjustment of the potentiometers with an audio signal will cause the amplitude of the audio signal to be increased or decreased. If this application is used, the neutral wires are connected in parallel through each potentiometer.

Figure 4:
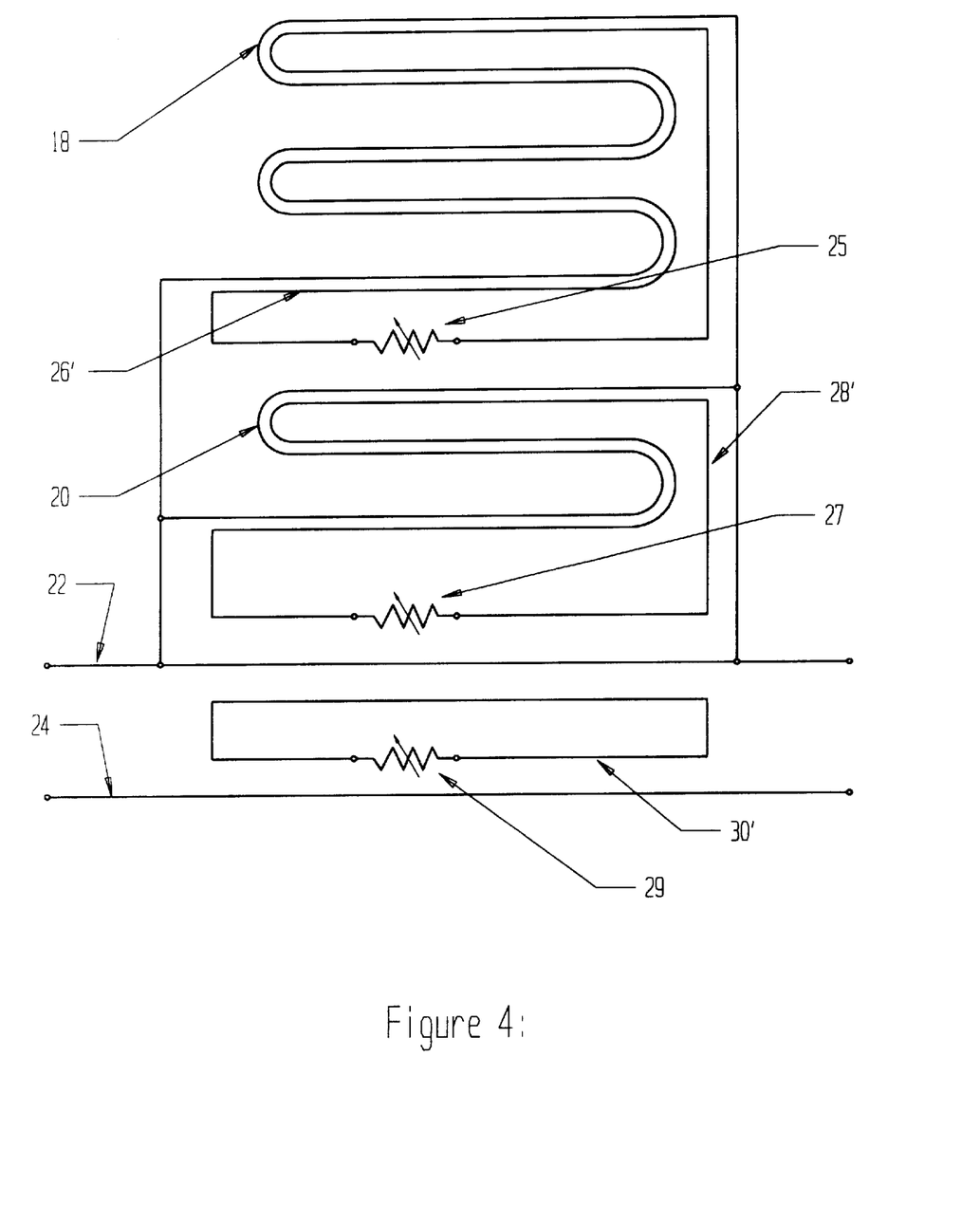
FIG. 4 is a cross sectional view of a spool with different wires wrapped around radially in accordance with the present invention.

FIG. 4 shows an Electrical Signal Phase Compensator 3' prime which incorporates an alternative way of connecting potentiometers to the neutral wires. The first potentiometer 25 is connected in series with the first neutral wire 26. The second potentiometer 27 is connected in series with the second neutral wire 28. The third potentiometer 29 is connected in series with the third neutral wire 30. Adjustment of the potentiometers with an audio signal will cause the amplitude of the audio signal to be increased or decreased.

Preferred dimensions for the conductors and the ground wire are the same as those found in the three wire electrical signal phase compensator 2. The lengths of the neutral wires correspond to the lengths of the conductors.

The conductors and neutral wires maybe stored by wrapping thereof around a spool in radial relation to each other. The third conductor 22 is wrapped around the spool first, then the third neutral wire 30 is wrapped around the third conductor 22. Next, the second conductor 20 is wrapped around the third neutral wire 30 and the second neutral wire 28 is wrapped around the second conductor 20. Finally, the first conductor 18 is wrapped around the second neutral wire 28 and the first neutral wire 26 is wrapped around the first conductor 18. The wrapping direction of each conductor and neutral wire on the spool is changed at least once to prevent the generation of any inductance therein. The conductor or neutral wire would be wrapped clockwise for a while then wrapped counterclockwise to cancel inductive effect.

The conductors and neutral wires may also be stored by wrapping thereof around a spool adjacent to each other. The third conductor 22 is wrapped around the spool first, then the third neutral wire 30 is wrapped adjacent to the third conductor 22. Next, the second conductor 20 is wrapped adjacent to the third neutral wire 30 and the second neutral wire 28 is wrapped adjacent to the second conductor 20. Finally, the first conductor 18 is wrapped adjacent to the second neutral wire 28 and the first neutral wire 26 is wrapped adjacent to the first conductor 18. The same order of wrapping would occur if no neutral wires were included.

The electrical signal phase compensator may also be stored by wrapping conductors around each other. The length of the second conductor 20 is wrapped around the length of the third conductor 22. Then the length of the wrapped second conductor 20 and the third conductor 22 are wrapped around the length of the first conductor 18 is wrapped around the second conductor 20. The three conductors with a ground wire may be encapsulated with a rubber exterior and then coiled in a box or the like. With a two conductor electrical signal phase compensator, the length of the first conductor 12 would be wrapped around the length of the second conductor 14.

Figure 5:
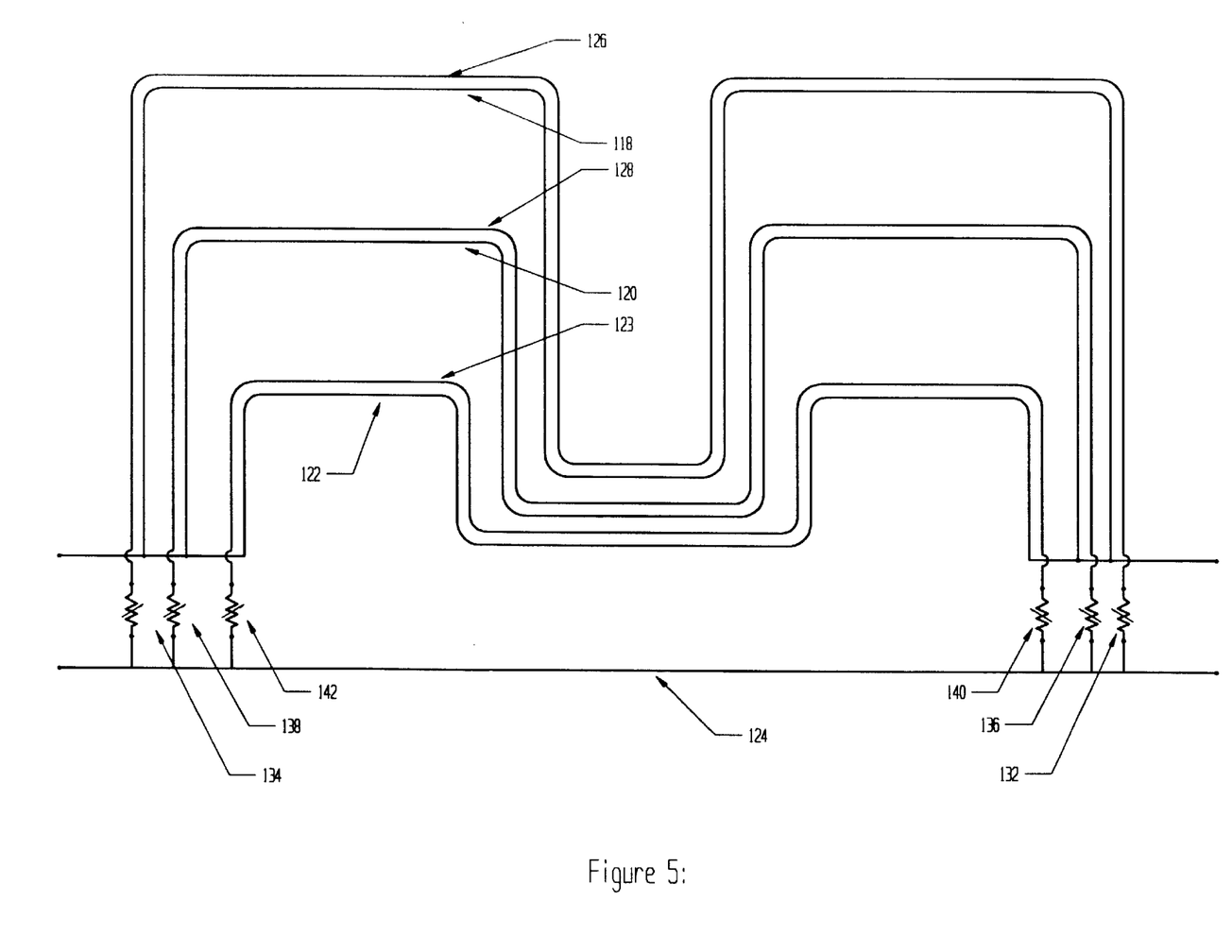
FIG. 5 is a schematic diagram of an electrical signal phase compensator with potentiometers connected to each end of the neutral wires.

FIG. 5 shows first, second and third conductors 118, 120, and 122 with respective neutral wires 126, 128, and 123. Each of the neutral wires 126, 128, and 123 have potentiometers 132, 134, 136, 138, 140 connected between each end and ground wire 124.

Figure 6:
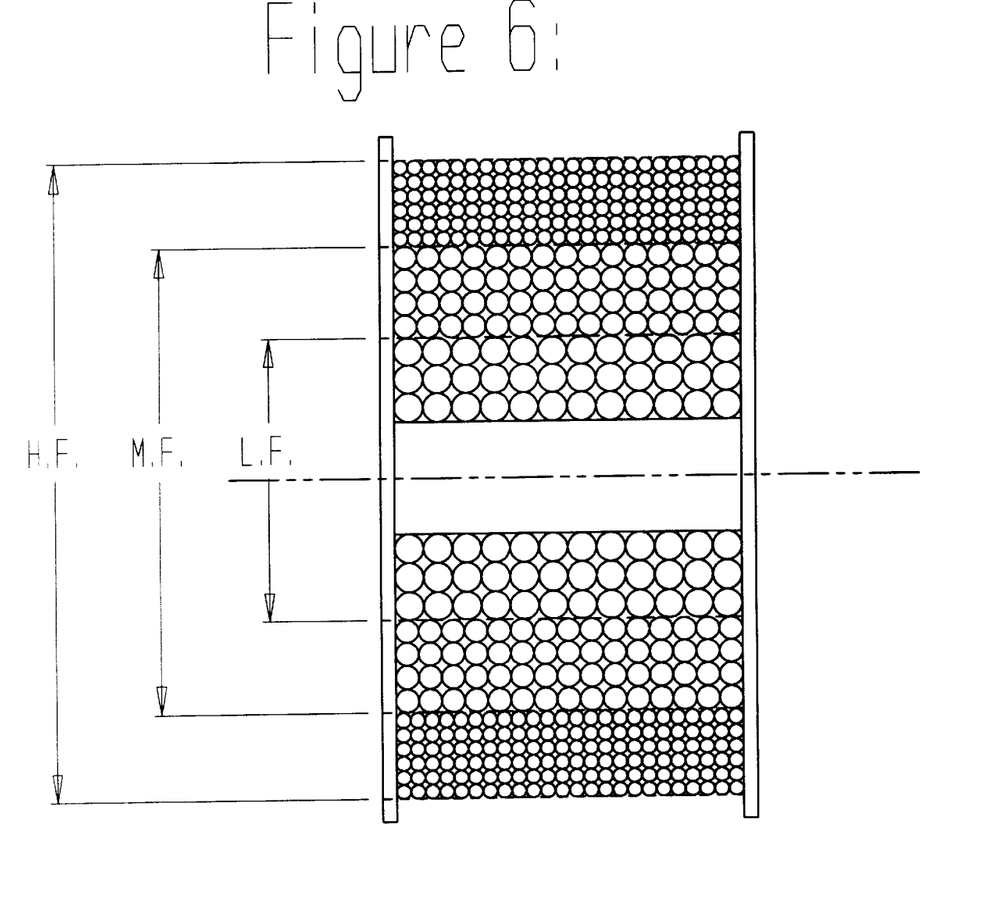
FIG. 6 is a typical wound compensator on a spool.

FIG. 6 illustrates a typical spool wound compensator with the 3 different frequency codes.

A two or three conductor electrical signal phase compensator may be implemented using traces on a circuit board. The different conductors may be replicated on the circuit board by nesting different length traces within each other or in multiple layers. It is preferable to use different widths of traces for different frequency ranges to further improve the signal quality. The width of traces will correspond to the wire diameters previously given for the two and three conductor electrical signal phase compensators. The length of a third signal trace is two feet. A second signal trace is at least two and one half times longer than the third signal trace. A first signal trace is at least two and one half times longer than the second conductor. The ground trace may be any length that is convenient relative to the length of the third signal trace. The width of the ground trace should be equal to the width of the largest signal trace. The first signal trace wire, the second signal trace, and the third signal trace are connected in parallel.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

I claim:

1. A three conductor electrical signal phase compensator comprising:

a first conductor;

a second conductor;

a third conductor, said second conductor being substantially longer than said third conductor, said first conductor being substantially longer than said second conductor, said first, second, and third conductors being connected in parallel; and, a ground wire.

2. A three conductor electrical signal phase compensator according to claim 1 comprising:

circuit board; wherein said first, second and third conductors comprise a first signal trace; a second signal trace; and a third signal trace on said circuit board, said second signal trace being substantially longer than said third signal trace, said first signal trace being substantially longer than said second signal trace.

3. The three conductor electrical signal phase compensator of claim 2, wherein:

said first signal trace has a width which is smaller than the width of said second conductor; and said second conductor has a width which is smaller than that of said third conductor.

4. A three conductor electrical signal phase compensator comprising:

a first conductor;

a second conductor;

a third conductor, said second conductor being substantially longer than said third conductor, said first conductor being substantially longer than said second conductor, said first, second, and third conductors being connected in parallel; and, first neutral wire;

second neutral wire;

third neutral wire, said second neutral wire, and said first neutral wire being connected in parallel;

a first potentiometer being connected to one end of said neutral wires and ground on the other; and a second potentiometer being connected to the other end of said neutral wires and ground on the other.

5. The three conductor electrical signal phase compensator of claim 4, further comprising:

a spool, said third conductor being wrapped around said spool, said third neutral wire being wrapped around said third conductor, said second conductor being wrapped around said third neutral wire, said second neutral wire being wrapped around said second conductor, said first conductor being wrapped around said second neutral wire, said first neutral wire being wrapped around said first conductor.

6. The three conductor electrical signal phase compensator of claim 4, further comprising:

a spool, said third conductor being wrapped around said spool, said third neutral wire being wrapped around said spool and adjacent to said third conductor, said second conductor being wrapped around said spool and adjacent to said third neutral wire, said second neutral wire being wrapped around said spool and adjacent to said second conductor, said first conductor being wrapped around said spool and adjacent to said second neutral wire, said first neutral wire being wrapped around said spool and adjacent to said first conductor.

7. The three conductor electrical signal phase compensator of claim 4 wherein:

a first potentiometer is connected to one end of said first neutral wire and ground on the other end of said first potentiometer, a second potentiometer being connected to the other end of said first neutral wire and ground on the other end of said second potentiometer;

a third potentiometer being connected to one end of said second neutral wire and ground on the other end of said third potentiometer, a fourth potentiometer being connected to the other end of said second neutral wire and ground on the other end of said fourth potentiometer; and a fifth potentiometer being connected to one end of said third neutral wire and ground on the other end of said fifth potentiometer, a sixth potentiometer being connected to the other end of said third neutral wire and ground on the other end of said sixth potentiometer.

8. A three conductor electrical signal phase compensator comprising:

a first conductor;

a second conductor;

a third conductor, said second conductor being substantially longer than said third conductor, said first conductor being substantially longer than said second conductor, said first, second, and third conductors being connected in parallel;

said first conductor having a cross-section which is smaller than a cross-section of said second conductor; and said second conductor having a cross-section which is smaller than a cross-section of said third conductor.

9. A three conductor electrical signal phase compensator comprising:

a first conductor;

a second conductor;

a third conductor, said second conductor being substantially longer than said third conductor, said first conductor being substantially longer than said second conductor, said first, second, and third conductors being connected in parallel;

said second conductor being wrapped around said third conductor, said first conductor being wrapped around said second conductor.

10. The three conductor electrical signal phase compensator of claim 9 further comprising:

a spool, said third conductor being wrapped around said spool, said second conductor being wrapped around said third conductor, said first conductor being wrapped around said second conductor.

11. A three conductor electrical signal phase compensator comprising:

a first conductor;

a second conductor;

a third conductor, said second conductor being substantially longer than said third conductor, said first conductor being substantially longer than said second conductor, said first, second, and third conductors being connected in parallel; and, a spool, said third conductor being wrapped around said spool, said second conductor being wrapped around said spool and adjacent to said third conductor, said first conductor being wrapped around said spool and adjacent to said second conductor.

12. A three conductor electrical signal phase compensator comprising:

a first conductor;

a second conductor;

a third conductor, said second conductor being substantially longer than said third conductor, said first conductor being substantially longer than said second conductor, said first, second, and third conductors being connected in parallel; and, a first neutral wire;

a second neutral wire;

a third neutral wire, said second neutral wire, and said first neutral wire being connected in parallel;

a first potentiometer connected in series with said first neutral wire;

a second potentiometer connected in series with said second neutral wire; and a third potentiometer connected in series with said third neutral wire.

13. A three conductor electrical signal phase compensator comprising:

a first conductor;

a second conductor;

a third conductor, said second conductor being substantially longer than said third conductor, said first conductor being substantially longer than said second conductor, said first, second, and third conductors being connected in parallel; and, first neutral wire;

second neutral wire;

third neutral wire, said second neutral wire, and said first neutral wire being connected in parallel;

first resistor being connected to one end of said neutral wires and ground on the other; and second resistor being connected to the other end of said neutral wires and ground on the other.

14. The three conductor electrical signal phase compensator of claim 13 wherein said first resistor is connected in series with said first neutral wire;

said second resistor connected in series with said second neutral wire; and a third resistor is connected in series with said third neutral wire.

* * * * *